(12) United States Patent
Li et al.

(10) Patent No.: US 11,207,789 B2
(45) Date of Patent: Dec. 28, 2021

(54) ROBOTIC ARM AND ROBOT HAVING THE SAME

(71) Applicant: UBTECH ROBOTICS CORP LTD, Shenzhen (CN)

(72) Inventors: Youpeng Li, Shenzhen (CN); Youjun Xiong, Shenzhen (CN); Hongyu Ding, Shenzhen (CN); Meichun Liu, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 161 days.

(21) Appl. No.: 16/709,927

(22) Filed: Dec. 11, 2019

(65) Prior Publication Data

US 2020/0206959 A1 Jul. 2, 2020

(30) Foreign Application Priority Data

Dec. 29, 2018 (CN) .......................... 201811640830.5

(51) Int. Cl.
*B25J 18/00* (2006.01)
*B25J 17/02* (2006.01)
*B25J 9/00* (2006.01)
*B25J 9/10* (2006.01)

(52) U.S. Cl.
CPC ......... *B25J 17/0241* (2013.01); *B25J 9/0009* (2013.01); *B25J 9/101* (2013.01); *B25J 18/00* (2013.01)

(58) Field of Classification Search
CPC ...... B25J 9/0009; B25J 17/0241; B25J 18/00; B25J 19/00; B25J 19/025; B25J 9/101
USPC ........................................... 74/490.02
See application file for complete search history.

(56) References Cited

U.S. PATENT DOCUMENTS

| 7,104,153 | B2 * | 9/2006 | Matsumoto | .......... | B25J 19/0029 |
| | | | | | 74/490.01 |
| 9,770,824 | B2 * | 9/2017 | Hahakura | ............ | B25J 19/0029 |
| 10,718,413 | B2 | 7/2020 | Xiong et al. | | |
| 10,814,477 | B2 * | 10/2020 | Nishimura | ............... | B25J 9/041 |
| 2003/0060929 | A1 * | 3/2003 | Kullborg | .............. | B25J 19/0025 |
| | | | | | 700/245 |
| 2005/0167167 | A1 | 8/2005 | Miyazaki et al. | | |
| 2012/0111135 | A1 * | 5/2012 | Ichibangase | ......... | B25J 19/0025 |
| | | | | | 74/490.06 |

FOREIGN PATENT DOCUMENTS

CN 107953361 A 4/2018
JP 2016-215371 * 12/2016

* cited by examiner

*Primary Examiner* — William C Joyce (57) ABSTRACT

A robotic arm assembly includes a main body, a number of servos arranged within the main body, each of which has an output shaft, and a rotary connection member connected to the output shaft of one of the servos at a first end of the main body. The rotary connection member defines a through hole allows cables to pass therethrough.

16 Claims, 6 Drawing Sheets

ROBOTIC ARM AND ROBOT HAVING THE SAME

CROSS REFERENCE TO RELATED APPLICATIONS

This application claims priority to Chinese Patent Application No. 201811640830.5, filed Dec. 29, 2018, which are hereby incorporated by reference herein as if set forth in its entirety.

BACKGROUND

1. Technical Field

The present disclosure generally relates to robots, and particularly to a robotic arm having cable guiding structure and a robot including the arm.

2. Description of Related Art

Robotic arms are well known and typically include driving devices for multiple degrees of freedom. The driving devices of some conventional humanoid robots are electrically connected to a controller inside the torso of the robots via cables. The cables are wound around the joints of each arm of the robots, which is not an ideal arrangement.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
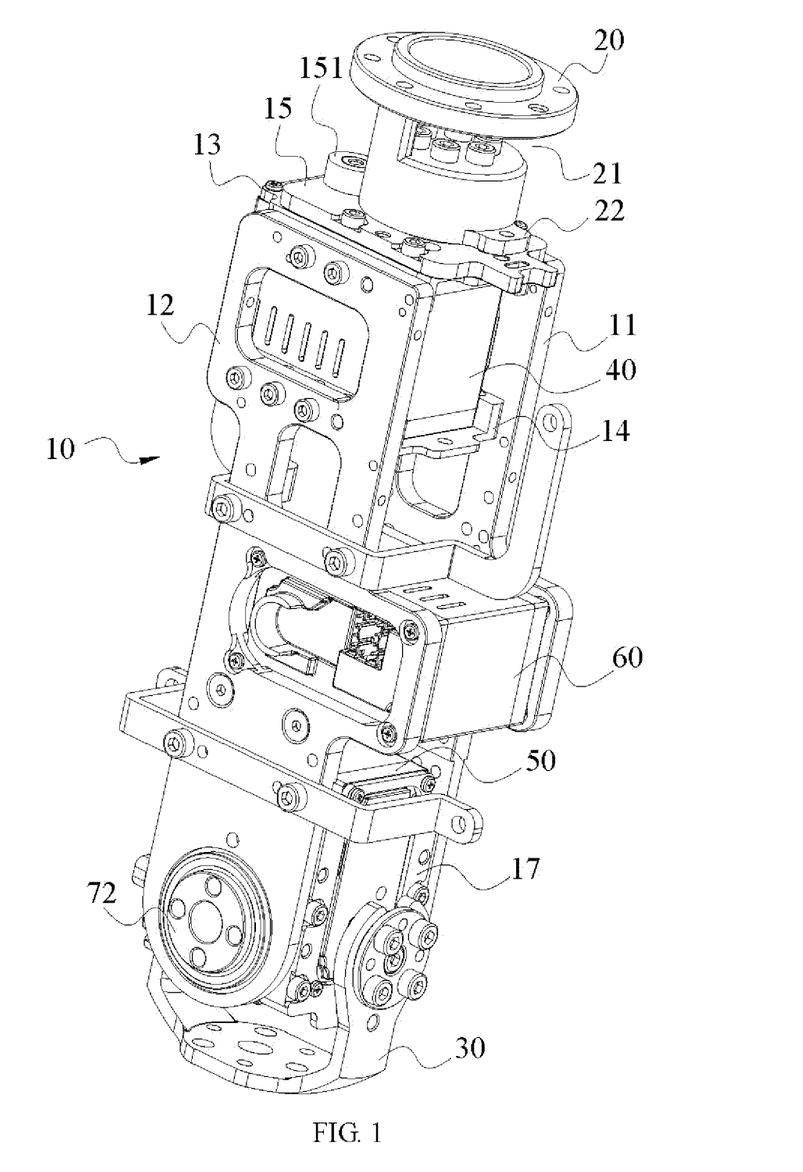
FIG. 1 is an isometric view of a robotic arm assembly according to an embodiment.
Figure 2:
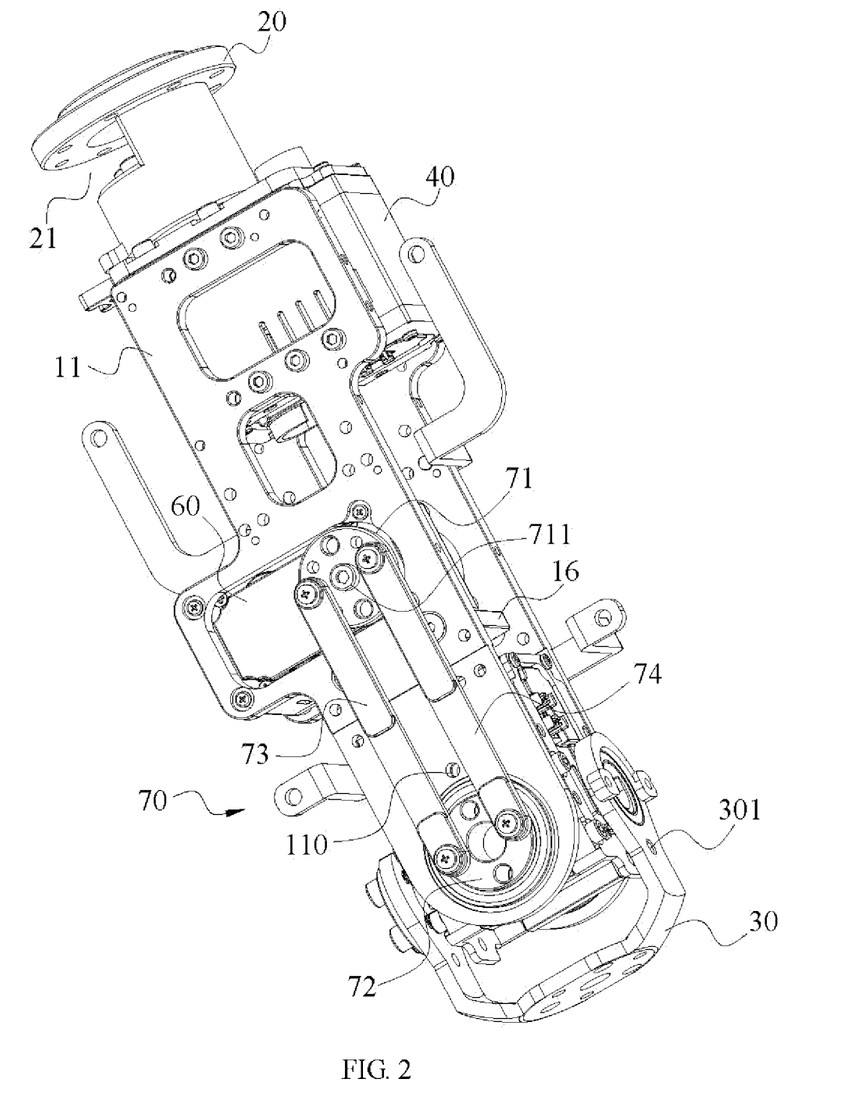
FIG. 2 is similar to FIG. 1, but viewed from a different perspective.

Referring to FIGS. 1 and 2, in one embodiment, a robotic arm includes a main body 10, a number of servos and a rotary connection member 20. The servos are arranged within the main body 10. The rotary connection member 20 is connected to the output shaft of one of the servos at a first end of the main body 10, and defines a through hole 21 allows cables to pass therethrough. The through hole 21 extends along the lengthwise direction of the main body 10.

With such configuration, cables arranged within the main body 10 can extend out through the through hole 21 and then be connected to external electrical components, which facilitates management of cables and can prevent cable tangles.

Figure 3:
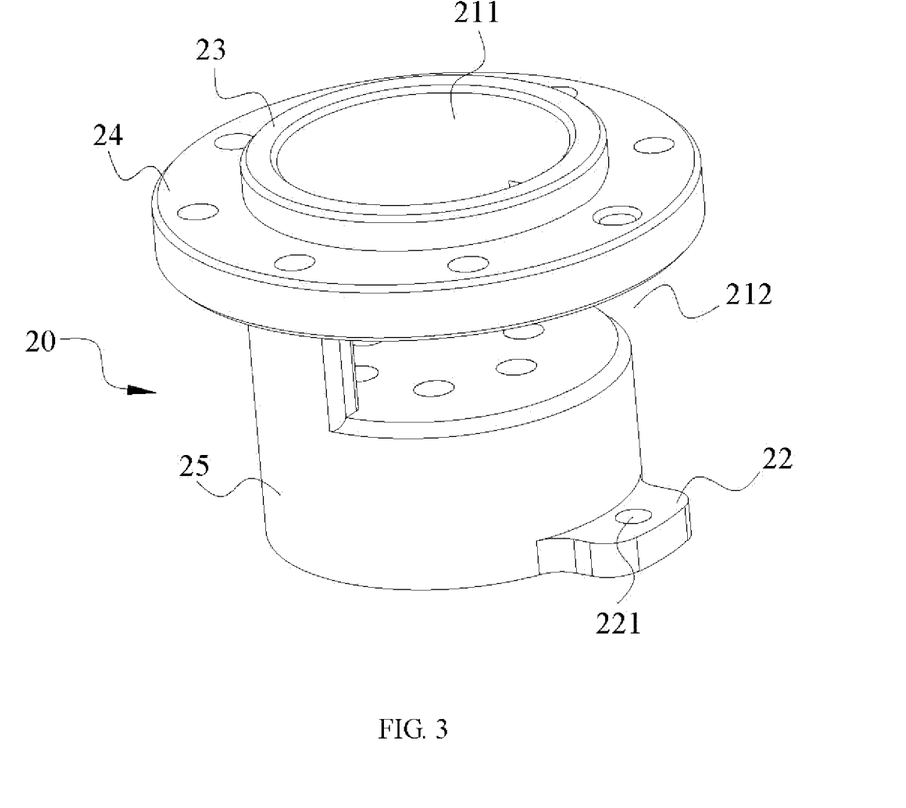
FIG. 3 is an isometric view of a rotary connection member of the arm assembly of FIG. 1.

Referring to FIG. 3, in one embodiment, the rotary connection member 20 defines an orifice 211 in an end thereof and a cutout 212 in a lateral surface thereof. The orifice 211 and the cutout 212 communicate with each other and form the through hole 21. It should be noted that the shape and size of the through hole 21 may be changed according to need, on the condition that cables within the main body 10 can pass through the through hole 21.

In one embodiment, the rotary connection member 20 includes a first segment 23, a second segment 24, and a third segment 25 that are sequentially connected to one another. The orifice 211 sequentially penetrates the first segment 23 and the second segment 24, and the cutout 212 is defined in the third segment 25 and sized according to the orifice 211. The outer diameter of the second segment 24 is greater than that of the first section 23 and the third section 25 to facilitate attachment of the rotary connection member 20 to other components. In one embodiment, the first segment 23, the second segment 24 and the third segment 25 are integrally formed to facilitate simplification of the structure and cost.

In one embodiment, the servos are three in number and will be referred to as elbow servo 40, first hand servo 50 and second hand servo 60. The elbow servo 40 is connected to the first end of the main body 10. The first hand servo 50 is connected to a second end of the main body 10 opposite the first end. The second hand servo 60 is arranged in the main body 10 between the elbow servo 40 and the first hand servo 50. The rotary connection member 20 is arranged around and rotates together with the output shaft of the elbow servo 40.

In one embodiment, the output shaft of the elbow servo 40 extends along the lengthwise direction of the main body 10, and the output shaft of the first hand servo 50 and the output shaft of the second hand servo 60 extends along the widthwise direction of the main body 10. The output shaft of the first hand servo 50 and the output shaft of the second hand servo 60 are spaced apart from and perpendicular to each other.

In one embodiment, the main body 10 includes a first side plate 11, a second side plate 12, a first connection member 13, a second connection member 14 and a bearing holder 15. The second side plate is parallel to and symmetric with the first side plate 11. The first connection member 13 is arranged between the first side plate 11 and the second side plate 12 and has two ends that are respectively fixed to the first side plate 11 and the second side plate 12 via fasteners, such as screws. The second connection member 14 is parallel to the first connection member 13 and arranged between the first side plate 11 and the second side plate 12.

The second connection member 14 has two ends that are respectively fixed to the first side plate 11 and the second side plate 12 via fasteners, such as screws. The elbow servo 40 is arranged between the first connection member 13 and the second connection member 14 and has two ends that are respectively fixed to the first connection member 13 and the second connection member 14 via fasteners, such as screws.

Figure 4:
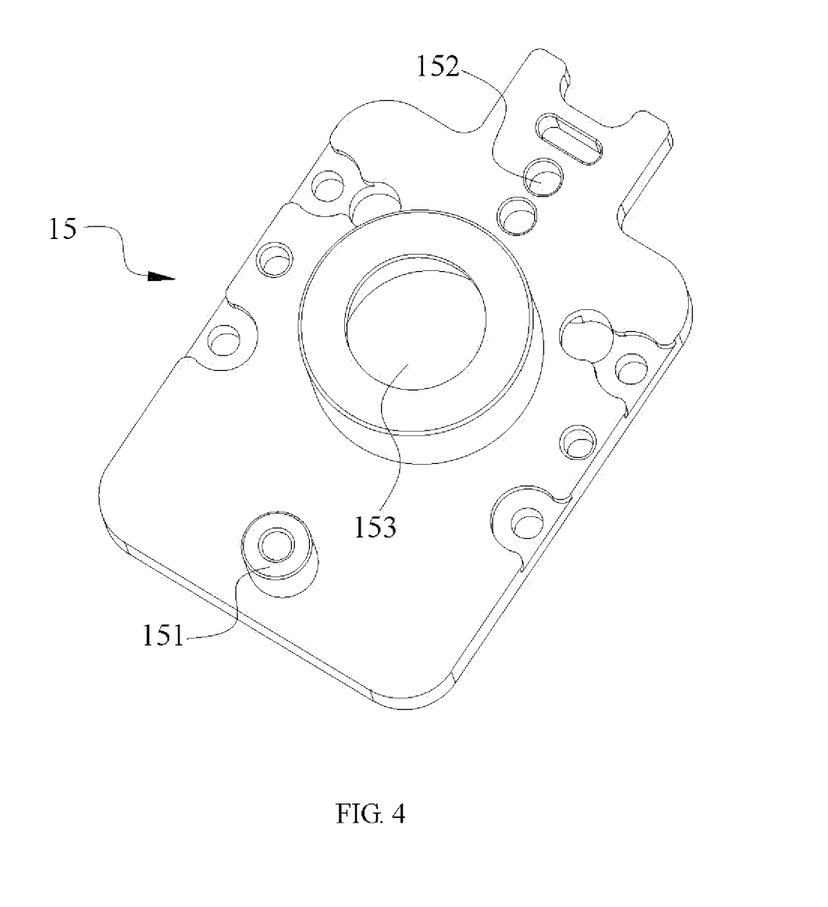
FIG. 4 is an isometric view of a bearing holder of the arm assembly of FIG. 1.

The bearing holder 15 is connected to the first connection member 13. The output shaft of the elbow servo 40 passes through the first connection member 13 and the bearing holder 15. Referring to FIG. 4, a bearing receiving hole 153 is defined in a central portion of the bearing holder 15, and a bearing is mounted in the bearing receiving hole 153. The output shaft of the elbow servo 40 passes through the bearing in the bearing receiving hole 153.

One end of the rotary connection member 20 adjacent to the bearing holder 15 includes a first protrusion 22 protruding outwardly along a radial direction thereof. The first protrusion 22 protrudes from the third segment 25 of the rotary connection member 20 along a radial direction thereof. In one embodiment, the first protrusion 22 is integrally formed with the rotary connection member 20 to facilitate simplification of the structure and cost.

The bearing holder 15 includes a second protrusion 151 that is used to stop rotation of the rotary connection member 20 when the second protrusion 151 comes into contact with the first protrusion 22. In one embodiment, the second protrusion 151 is cylindrical and located adjacent to an end of the bearing holder 151. In one embodiment, the second protrusion 151 is integrally formed with the bearing holder 15 to facilitate simplification of the structure and cost.

It should be noted that the position of the first protrusion 22 and the second protrusion 151 can be adjusted according to need and is not limited to the embodiment above.

In one embodiment, a first through hole 221 extends through the first protrusion 22 along a direction parallel to the lengthwise direction of the rotary connection member 20. The first through hole 221 is used to potion the elbow servo 40. The bearing holder 15 defines a second through hole 152 aligned with the first through hole 221 so as to potion the elbow servo 40. The through hole 152 extends along a thickness direction of the bearing holder 15. During assembly, a pin is inserted into the first through hole 221 and the second through hole 152 so as to determine an initial angular angle of the elbow servo 40. With such arrangement, the output shaft of the elbow servo 40 is rotated to a desired position such that rotary connection member 20 is accurately in a desired orientation with respect the bearing holder 15. The current angular angle of the output shaft of the elbow servo 40 is then determined as the initial angular angle of the elbow servo 40, which serves as a basis for control of the elbow servo 40. In the embodiment, the second through hole 152 is arranged at one end of the bearing holder 15 away from the second protrusion 151.

In one embodiment, the main body 10 further includes a reinforcement plate 16 arranged between the first side plate 11 and the second side plate 12. Two opposite ends of the reinforcement plate 16 are respectively connected to the first side plate 11 and the second side plate 12 via fasteners, such as screws. The reinforcement plate 16 is located below the second hand servo 60, and more specifically in the intermediate region of the first side plate 11 and the second side plate 12. In the embodiment, the arrangement of the reinforcement plate 16 is to enhance the strength of the main body 10.

In one embodiment, the arm assembly further includes a hand connection member 30 and a linkage bar mechanism 70. The hand connection member 30 is arranged at the second end of the main body 10 and arranged around and rotatable together with the output shaft of the first hand servo 50.

Figure 5:
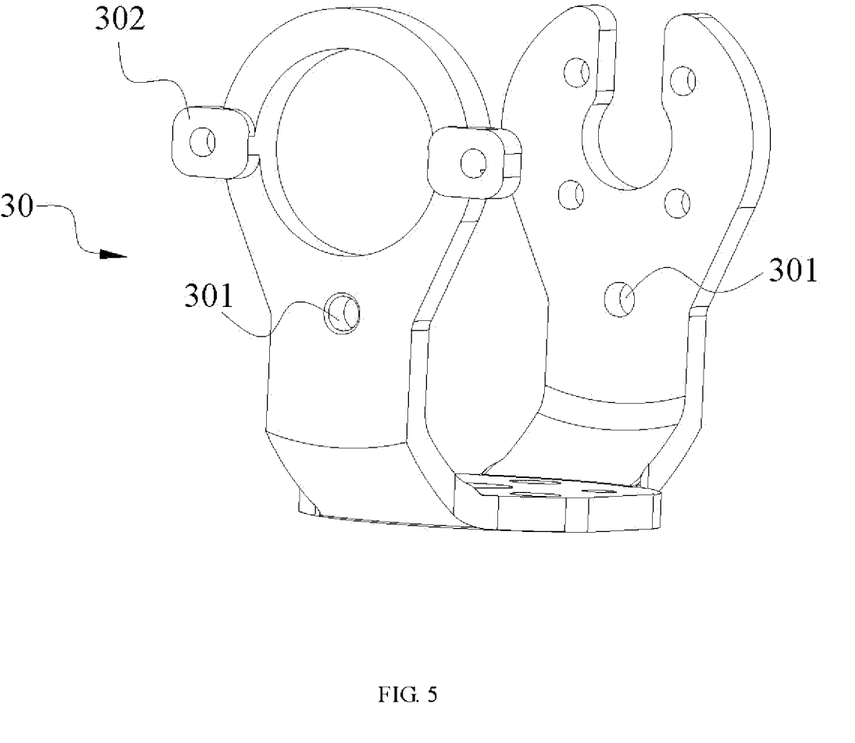
FIG. 5 is an isometric view of a hand connection member of the arm assembly of FIG. 1.

The linkage bar mechanism 70 includes a disc 71, a pair of rotary members 72, a first linkage bar 73, and a second linkage bar 74. The disc 71 is arranged around and rotatable together with the output shaft of the second hand servo 60. The rotary members 72 are arranged in the first side plate 11 and the second side plate 12. Specifically, two through holes are formed in the first side plate 11 and the second side plate 12, and the rotary members 72 are respectively received in the through holes of the first side plate 11 and the second side plate 12. Referring to FIG. 5, the hand connection member 30 is substantially U-shaped, and two fixing portions 302 are respectively arranged on opposite ends of a sidewall of the hand connection member 30.

One end of the first linkage bar 73 is rotatably connected to the disc 71, and the other end of the first linkage bar 73 is rotatably connected to one of the rotary members 72. The second linkage bar 74 is arranged in parallel with the first linkage bar 73. One end of the second linkage bar 74 is rotatably connected to the disc 71, and the other end of the second linkage bar 74 is rotatably connected to the one of the rotary members 72. In one embodiment, ends of the first linkage bar 73 and the second linkage bar 74 are respectively rotatably connected to the disc 71 at opposite edges thereof, and the other ends od the first linkage bar 73 and the second linkage bar 74 are respectively rotatably connected to the one of the rotary members 72 at opposite edges thereof.

The arm assembly further includes a third connection member 17 and a fourth connection member. The third connection member 17 is arranged at one end of the first hand servo 50 and located between the first side plate 11 and the second side plate 12. The fourth connection member is arranged at the opposite end of the first hand servo 50 and located between the first side plate 11 and the second side plate 12. The one of the rotary members 72 is fixed to the third connection member 17 and the fourth connection member. The third connection member 17 and the fourth connection member are respectively fixed to opposite sides of the housing of the first hand servo 50 by screws, and the one of the rotary members 72 is fixedly connected to the third connection member 17 and the fourth connection member by screws. The third connection member 17, the fourth connection member, the rotary members 72 in the first side plate 11 and the second side plate 12 corporately form a space for mounting the first hand servo 50 therein. When the second and servo 60 drives the disc 71 to rotate, the first linkage bar 73 and the second linkage bar 74 are moved, thereby driving the one of the rotary members 72 to rotate. The rotary member 72 then drives the first hand servo 50 and the hand connection member 30 to rotate.

The disc 71 includes a third protrusion 711 between the first linkage bar 73 and the second linkage bar 74. In the embodiment, the third protrusion 711 is a screw on the center of the disc 71. One end of the screw is inserted through the disc 71 and fixed to the output shaft of the second hand servo 60. The screw rotates together with the disc 71 and the output shaft of the second hand servo 60. The third protrusion 711 serves as a stopper member. When the first linkage bar 73 or the second linkage bar 74 comes into contact with the third protrusion 711, its rotation is stopped.

Figure 6:
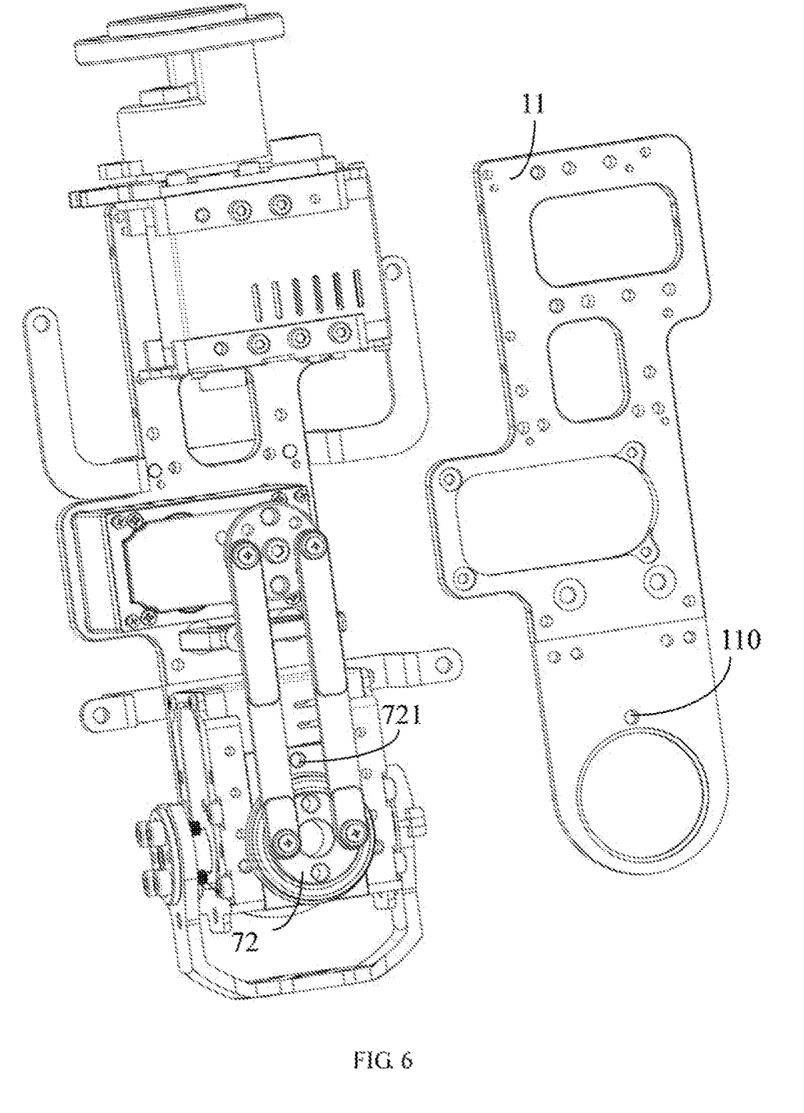
FIG. 6 is an isometric view of a robotic arm assembly of FIG. 1, with a first side plate removed from the assembly.

In one embodiment, the first side plate 11 defines a third through hole 110 that extends through the first side plate 11 along a thickness direction of the first side plate 11. The one of the rotary members 72 defines a fourth through hole 721 (see FIG. 6) that matches the third through hole 110 to determine an initial angular angle of the second hand servo 60. The fourth through hole extends through the one of the rotary members 72 along a thickness direction of the rotary member 72. During assembly, the one of the rotary members 72 is rotated to a desired position so as to align the fourth through hole with the third through hole 110. A pin is then inserted into the third through hole 110 and the fourth through hole. With such arrangement, the output shaft of the second hand servo 60 is rotated to a desired position such that rotary member 72 is accurately in a desired orientation with respect to the first side plate 11. The current angular angle of the output shaft of the second hand servo 60 is then determined as the initial angular angle of the second hand servo 60, which serves as a basis for control of the second hand servo 60. In the embodiment, the third through hole 110 is located between the first linkage bar 73 and the second linkage bar 74.

In one embodiment, the hand connection member 30 defines two fifth through holes 301 in opposite ends thereof. The through holes 301 extend through the two sidewalls of the hand connection member 30 along the thickness direction of the sidewalls. The third connection member 17 and the fourth connection member each define a sixth through hole along the thickness direction thereof. The sixth through holes are respectively aligned with the fifth through holes 301 so as to determine an initial angular angle of the first hand servo 50. During assembly, pins are first inserted into the fifth through holes 301 and then the sixth through holes. With such arrangement, the output shaft of the first hand servo 50 is rotated to a desired position such that the hand connection member 30 is in accurately orientation with respect to the third connection member 17. The current angular angle of the output shaft of the first hand servo 50 is then determined as the initial angular angle of the first hand servo 50, which serves as a basis for control of the first hand servo 50.

It should be noted that the first through hole 221, the second through hole 152, the third through hole 110, the fourth through hole, the fifth through holes 301, and the sixth through holes may be circular or polygonal. The first connection member 13, the second connection member 14, the third connection member 17, the fourth connection member and the reinforcement plate 16 are all made of sheet metal.

In one embodiment, the present disclosure further provides a robot including an arm assembly as described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic arm assembly comprising:
   a main body;
   a plurality of servos arranged within the main body, each of the plurality of servos comprising an output shaft; and
   a rotary connection member connected to the output shaft of one of the servos at a first end of the main body, the rotary connection member defines a through hole that allows cables to pass therethrough;
   wherein the plurality of the servos comprise an elbow servo connected to the first end of the main body, and the rotary connection member is arranged around the output shaft of the elbow servo;
   wherein the main body comprises a first side plate, a second side plate that is parallel to the first side plate, a first connection member comprising two ends that are respectively fixed to the first side plate and the second side plate, a second connection member that is parallel to the first connection member and comprises two ends that are respectively fixed to the first side plate and the second side plate, and a bearing holder connected to the first connection member, the output shaft of the elbow servo passes through the first connection member and the bearing holder, one end of the rotary connection member adjacent to the bearing holder comprises a first protrusion protruding outwardly along a radial direction thereof, and the bearing holder comprises a second protrusion that is configured to stop rotation of the rotary connection member when the second protrusion comes into contact with the first protrusion.

2. The robotic arm assembly according to claim 1, wherein the rotary connection member defines an orifice in an end thereof and a cutout in a lateral surface thereof, and the orifice and the cutout communicate with each other and form the through hole.

3. The robotic arm assembly according to claim 1, wherein the plurality of the servos comprise a first hand servo connected to a second end of the main body opposite the first end, and a second hand servo arranged between the elbow servo and the first hand servo.

4. The robotic arm assembly according to claim 1, wherein the first protrusion defines a first through hole, and the bearing holder defines a second through hole aligned with the first through hole so as to determine an initial angular angle of the elbow servo.

5. The robotic arm assembly according to claim 1, further comprising:
   a hand connection member arranged at the second end of the main body and arranged around the output shaft of the first hand servo;
   a third connection member arranged at one end of the first hand servo and located between the first side plate and the second side plate;
   a fourth connection member arranged at an opposite end of the first hand servo and located between the first side plate and the second side plate; and
   a linkage bar mechanism comprising:
     a disc arranged around the output shaft of the second hand servo;
     a pair of rotary members respectively rotatably connected to the first side plate and the second side plate, the rotary members being respectively fixed to the third connection member and the fourth connection member;
     a first linkage bar having two opposite ends that are respectively rotatably connected to the disc and one of the rotary members; and
     a second linkage bar having two opposite ends that are respectively rotatably connected to the disc and one of the rotary members, the second linkage bar being parallel to the first linkage bar.

6. The robotic arm assembly according to claim 5, wherein the disc comprises a third protrusion between the first linkage bar and the second linkage bar.

7. The robotic arm assembly according to claim 5, wherein the first side plate defines a third through hole, the one of the rotary members defines a fourth through hole that is configured to match the third through hole to determine an initial angular angle of the second hand servo, and the third through hole is located between the first linkage bar and the second linkage bar.

8. The robotic arm assembly according to claim 5, wherein the hand connection member defines two fifth through holes in opposite ends thereof, and the third connection member and the fourth connection member each define a sixth through hole, and the sixth through holes are respectively aligned with the fifth through holes so as to determine an initial angular angle of the first hand servo.

9. A robot comprising:
an arm comprising:
a main body;
a plurality of servos arranged within the main body, each of the plurality of servos comprising an output shaft; and
a rotary connection member connected to the output shaft of one of the servos at a first end of the main body, the rotary connection member defines a through hole that allows cables to pass therethrough;
wherein the plurality of the servos comprise an elbow servo connected to the first end of the main body, and the rotary connection member is arranged around the output shaft of the elbow servo;
wherein the main body comprises a first side plate, a second side plate that is parallel to the first side plate, a first connection member comprising two ends that are respectively fixed to the first side plate and the second side plate, a second connection member that is parallel to the first connection member and comprises two ends that are respectively fixed to the first side plate and the second side plate, and a bearing holder connected to the first connection member, the output shaft of the elbow servo passes through the first connection member and the bearing holder, one end of the rotary connection member adjacent to the bearing holder comprises a first protrusion protruding outwardly along a radial direction thereof, and the bearing holder comprises a second rotrusion that is configured to stop rotation of the rotary connection member when the second protrusion comes into contact with the first protrusion.

10. The robot according to claim 9, wherein the rotary connection member defines an orifice in an end thereof and a cutout in a lateral surface thereof, and the orifice and the cutout communicate with each other and form the through hole.

11. The robot according to claim 9, wherein the plurality of the servos comprise a first hand servo connected to a second end of the main body opposite the first end, and a second hand servo arranged between the elbow servo and the first hand servo.

12. The robot according to claim 9, wherein the first protrusion defines a first through hole, and the bearing holder defines a second through hole aligned with the first through hole so as to determine an initial angular angle of the elbow servo.

13. The robot according to claim 10, further comprising:
a hand connection member arranged at the second end of the main body and arranged around the output shaft of the first hand servo;
a third connection member arranged at one end of the first hand servo and located between the first side plate and the second side plate;
a fourth connection member arranged at an opposite end of the first hand servo and located between the first side plate and the second side plate; and
a linkage bar mechanism comprising:
a disc arranged around the output shaft of the second hand servo;
a pair of rotary members respectively rotatably connected to the first side plate and the second side plate, the rotary members being respectively fixed to the third connection member and the fourth connection member;
a first linkage bar having two opposite ends that are respectively rotatably connected to the disc and one of the rotary members; and
a second linkage bar having two opposite ends that are respectively rotatably connected to the disc and one of the rotary members, the second linkage bar being parallel to the first linkage bar.

14. The robot according to claim 13, wherein the disc comprises a third protrusion between the first linkage bar and the second linkage bar.

15. The robot according to claim 13, wherein the first side plate defines a third through hole, the one of the rotary members defines a fourth through hole that is configured to match the third through hole to determine an initial angular angle of the second hand servo, and the third through hole is located between the first linkage bar and the second linkage bar.

16. The robot according to claim 13, wherein the hand connection member defines two fifth through holes in opposite ends thereof, and the third connection member and the fourth connection member each define a sixth through hole, and the sixth through holes are respectively aligned with the fifth through holes so as to determine an initial angular angle of the first hand servo.

* * * * *